J. ESLAMAN.
Wheat Dampener.

No. 65,189.

Patented May 28, 1867.

United States Patent Office.

JACOB ESLAMAN, OF BELLEVILLE, ILLINOIS.

Letters Patent No. 65,189, dated May 28, 1867.

WHEAT-DAMPENER.

The Schedule referred to in these Letters Patent and making part of the same.

TO ALL WHOM IT MAY CONCERN:

Be it known that I, JACOB ESLAMAN, of Belleville, in the county of St. Clair, and State of Illinois, have invented a new Wheat-Dampener; and I hereby declare that the following is a full and clear description thereof, reference being had to the accompanying drawings, and to the letters of reference marked thereon.

This invention relates to the introduction of a jet of steam into the feed-spout from the stock-hopper of a flouring-mill, in such a manner as to thoroughly dampen the exterior of the kernels without the dampness penetrating to the interior of the same, the object being to toughen the skin of the grain so that the bran will peel off clean from the floury portions of it, and thereby not only lessen the weight of the bran, by removing from it a greater quantity of flour, but also improve the quality of the flour manufactured, by removing the bran entire, without cutting it up into dark specks. A conveyer-screw is used to thoroughly mix up the grain in a trough, and thus insure a uniform dampening of the whole mass before it passes to the stones to be ground. Former devices for this purpose have failed to be beneficial, from the unevenness of the dampening, which unevenness the screw appliance herein shown and described wholly remedies.

To enable those skilled in the art to make and use my improved dampener, I will proceed to describe its construction and operation.

Figure 1:
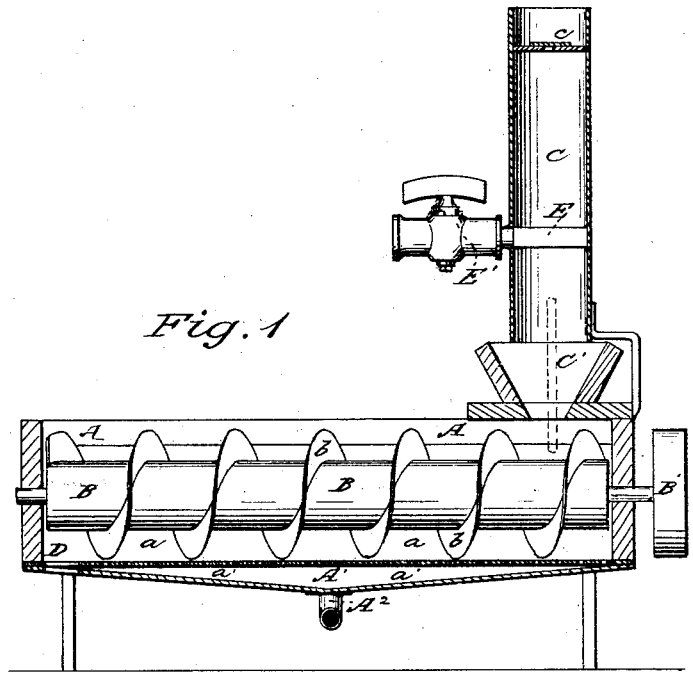

Figure 1 of the drawings is a sectional elevation of the said dampener.

Figure 2:
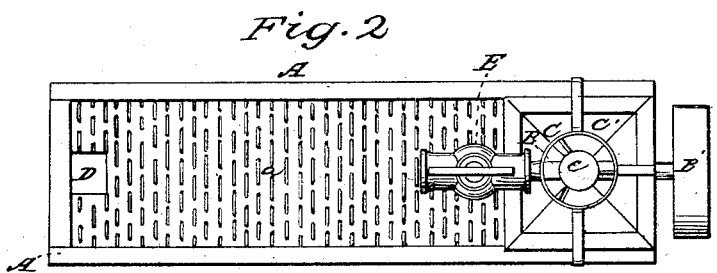

Figure 2 is a plan, without the mixing-screw.

A is the mixing-trough, which has a perforated bottom, $a$, through which any condensed dampness may escape into the chamber $A^1$ below it, and where it will be collected by the hopper-bottom $a'$, and drawn off through the waste pipe $A^2$. The conveyer-screw $B-b$, which receives a rotary motion from the band-wheel $B'$, fits nicely into the trough A, and by its continuous motion thoroughly mixes up the whole mass of the grain, as it conveys it from the feed-spout C, at one end of the trough, to the exit D, at the other end of it, whence it passes into the hopper to be ground. The feed-spout C, which conveys the grain from the stock-hopper (not shown) to the screw-hopper $C'$, has a distributor, $c$, near its upper end, which scatters the falling grain into a shower in the lower part of the said spout, and thus exposes it more thoroughly to contact with the steam, which enters the spout through very fine perforations in the bottom of the steam pipe E. The stop-cock $E'$ may be used to regulate the flow of the steam, or to wholly suspend it. By the use of the screw $B-b$ the whole of the grain will be very evenly dampened, and none of it so much as to impair the grinding of it.

I do not claim that the conveyer-screw is any invention of mine, as it is in common use for various purposes in flouring-mills; neither do I claim the introduction of steam into the feed-spout as anything new, well knowing that it has before been used, or attempted to be used, for the same purpose for which I use it; but the arrangements were so imperfect as to dampen the grain too much in some places, and not enough in others, thereby wholly invalidating its application.

Having described my invention, what I claim, is—

The combination of the conveyer-screw B and mixing-trough A with the steam-dampening apparatus, consisting of the spout C and steam-pipe E, arranged in manner described.

In testimony of which invention I hereunto set my hand and seal this second day of October, A. D. 1866, in presence of—

JACOB ESLAMAN.

Witnesses:
M. RANDOLPH,
S. M. RANDOLPH.